United States Patent [19]
Hilditch

[11] Patent Number: 5,737,763
[45] Date of Patent: Apr. 7, 1998

[54] INCREMENTAL DISK BACKUP

[75] Inventor: Albert Stephen Hilditch, Stockport, England

[73] Assignee: International Computers Limited, Putney, England

[21] Appl. No.: 620,470

[22] Filed: Mar. 22, 1996

[30] Foreign Application Priority Data

Mar. 30, 1995 [GB] United Kingdom ............... 9506501

[51] Int. Cl.[6] .................................................. G06F 12/16
[52] U.S. Cl. .................................... 711/162; 711/112
[58] Field of Search .................................. 395/488, 489, 395/438, 439, 474, 475, 480

[56] References Cited

U.S. PATENT DOCUMENTS

| | | | |
|---|---|---|---|
| 4,686,620 | 8/1987 | Ng | 395/610 |
| 5,089,958 | 2/1992 | Horton et al. | 395/182.03 |
| 5,133,065 | 7/1992 | Cheffetz et al. | 395/181 |
| 5,263,154 | 11/1993 | Eastridge et al. | 395/182.04 |
| 5,559,991 | 9/1996 | Kanfi | 395/489 |

*Primary Examiner*—Eddie P. Chan
*Assistant Examiner*—Kevin L. Ellis
*Attorney, Agent, or Firm*—Lee, Mann, Smith, McWilliams, Sweeney & Ohlson

[57] ABSTRACT

Each node of a distributed (multi-node) data processing system, which includes a plurality of shared data storage disks, has a respective incremental backup bit-file containing one bit for each datablock of the shared disks. The bits are initially set to logical 0. When a node writes data to a datablock the respective bit is reset to logical 1. Upon an incremental backup requirement, one node reads all of the bit-files, forms the logical OR thereof and forms a respective new bit-file. The blocks whose bits equal 1 in this new bit-file are then backed up. The bit-files are stored in the node main memories for quick access and will be lost upon node failure. However if a redo log is maintained, bit-files can be reconstructed.

18 Claims, 3 Drawing Sheets

INCREMENTAL DISK BACKUP

BACKGROUND OF THE INVENTION

This invention relates to incremental disk backup and in particular to a backup system and method for a distributed data processing system.

In a distributed data processing system there are multiple nodes each running their own instance of the operating system and their own instance of an application. Such systems often share disk resources. Any change to shared data must be agreed between software on every node. Agreement between software on the nodes can be difficult to implement without reducing system performance.

It is well known to backup data residing on magnetic disks, to protect against disk failure.

Incremental backup shortens backup time by backing up only those parts of the data that have been changed since the last backup. Incremental backup is usually performed on a file-by-file basis, using file timestamps which show when each file was last updated. A file is backed up only if its timestamp is later than the time of the last backup. Such backups cannot, in general, be performed on database management systems, which often perform their own file system management.

SUMMARY OF THE INVENTION

According to one aspect of the present invention there is provided a distributed data processing system including a plurality of processing nodes and a plurality of data storage disks which are shared between the nodes and each have a plurality of data blocks, each node storing a respective incremental backup bit-file containing one bit for each block on the shared disks, the respective bit being set when a said node writes data to a said block; means for reading the bit-files of all nodes, forming the logical OR thereof and producing a corresponding new incremental backup bit-file; and means for performing incremental backup in accordance with the new incremental backup bit-file.

According to another aspect of the present invention there is provided a method for achieving incremental backup in a distributed data processing system including a plurality of processing nodes and a plurality of data storage disks shared between the nodes and each having a plurality of data blocks, including the steps of storing a respective incremental backup bit-file at each node, the backup bit-files each containing one bit for each block on the shared disks; setting the respective bit when a said node writes data to a said block; and when incremental backup is required, reading the bit files of all nodes, forming the logical OR thereof and producing a corresponding new incremental backup bit-file, and performing incremental backup in accordance with the new incremental backup bit-file.

According to a further aspect of the present invention there is provided a distributed data processing system including:

a plurality of processing nodes;

a plurality of data storage disks, shared between the nodes, each having a plurality of data blocks;

a network interconnecting the nodes;

each node having a memory in which is stored a respective incremental backup bit-file containing one bit for each data block on the shared disks, which bits are initially set to a first of two possible states, and each node having means for setting the respective bit in its backup bit-file to the other of the two possible states when that node writes data to one of said data block;

at least one of said nodes including means for reading the backup bit-files of all of the nodes and forming the logical OR thereof, and producing a corresponding new incremental backup bit-file;

and the system including means for performing incremental backup in accordance with the new incremental backup bit-file by backing up those blocks whose bit-file bits are set to the other state.

According to yet another aspect of the present invention there is provided a method for achieving incremental backup in a distributed data processing system including a plurality of processing nodes each having a respective memory, a plurality of data storage disks each having a plurality of datablocks, the disks being shared between the nodes, the method including the steps of:

storing in the memory of each node a respective incremental backup bit-file containing one bit for each datablock on the shared disks, which bits are initially set to a first of two possible states, and setting the respective bit in a said backup bit-file to the other of the two possible states when the respective node writes data to one of said datablocks;

and wherein when incremental backup is required, causing one of said nodes to read the backup bit-files of all of the nodes, to form the logical OR thereof and to produce a corresponding new incremental backup bit-file, and performing incremental backup in accordance with the new incremental backup bit-file by backing up those blocks whose bits are set to the other state.

Embodiments of the invention will now be described with reference to the accompanying drawings, in which:

DESCRIPTION OF THE PREFERRED EMBODIMENT

Figure 1:
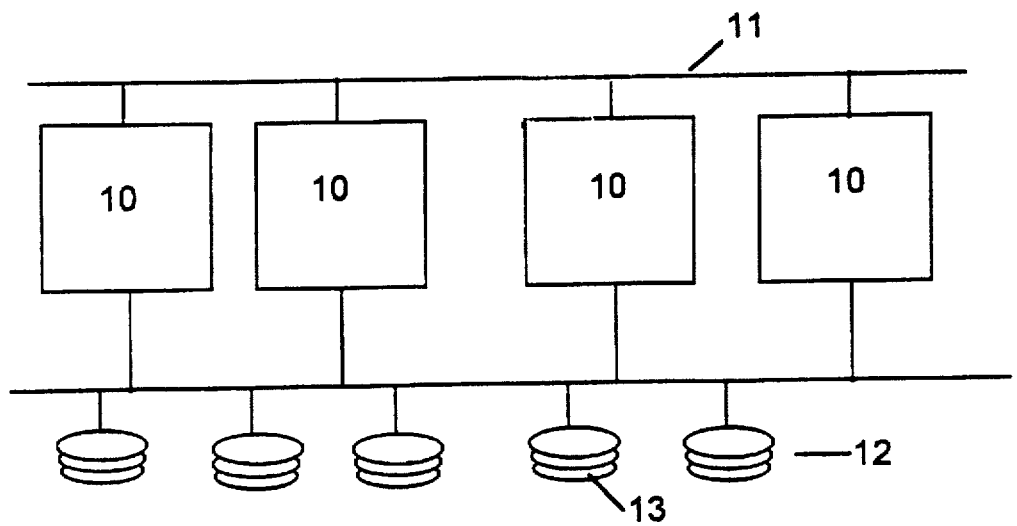
FIG. 1 illustrates, schematically, a distributed data processing system.
Figure 2:
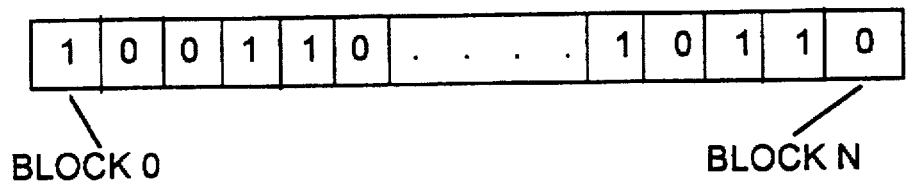
FIG. 2 illustrates the structure of an incremental backup bit-file.
Figure 3:
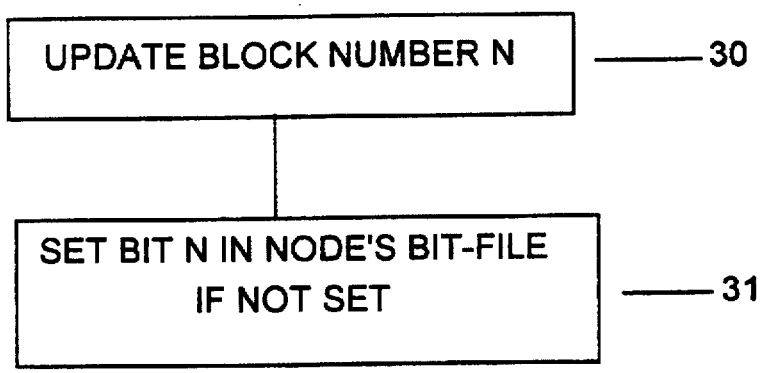
FIG. 3 is a flow chart which indicates the procedure when a data block is updated.

Reference is made to FIG. 1 which shows a typical distributed data processing system with which the invention is concerned. The system has a number of processing nodes 10, an inter-connecting network 11 and shared disks (datastorage), illustrated as a shared disk subsystem 12. Each disk 13 of subsystem 12 can be accessed from each of the nodes 10. In contrast to the conventional systems, each processing node 10 maintains a separate incremental backup bit-file, held in the main memory of the node and containing one bit for each data block on the shared disks. A typical bit-file structure is illustrated in FIG. 2. Initially all bits are set to 0. Whenever a node updates a block, it sets the corresponding bit in its bit-file to 1. This is shown schematically in FIG. 3. When a node updates block number n, as in step 30, the bit in the bit-file associated with the updated data block is set to 1, if it is not already 1, as in step 31. At the same time the update is, as normal, written to the application's redo log. The block size is typically 2, 4 or 8 Kbytes.

When an incremental backup of a shared disk system is required, one of the nodes 10 reads all of the bit files of the other nodes, and its own, and forms the logical OR of the bits relating to data blocks of the disks. It then backs up all blocks whose bits equal 1 in this logical OR, ie the blocks that have been updated by at least one of the nodes since the previous backup operation.

Figure 4:
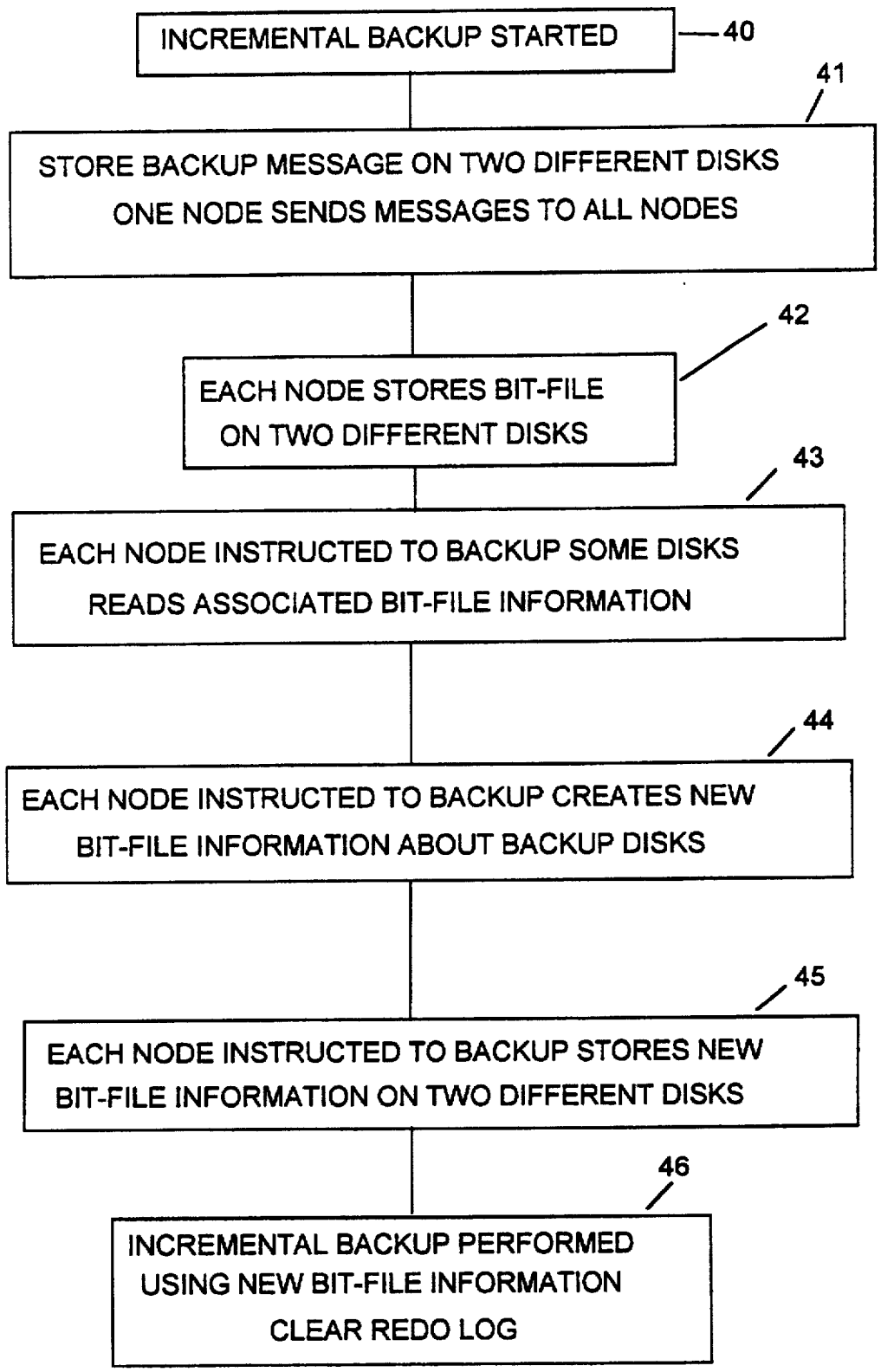
FIG. 4 is a flow chart which indicates the incremental backup procedure.

FIG. 4 shows an example of a possible procedure for this incremental backup. In step 40, incremental backup is started by one node. An incremental backup message which includes details of which node is to perform backup on which disk(s) in the shared disk system is constructed and stored by the one node on two different disks, as indicated in step 41. In that step the one node also sends the incremental backup message to each of the other nodes. Each node, including the one that started the procedure, responds to this message (command) to backup by storing its own bit-file on at least two different disks, as indicated in step 42, and then it clears its bit-file which is stored at the node itself.

Each node which has been instructed to backup at least one of the disks ("instructed node") then reads all of the bit-file information stored on the relevant disks as a result of backup message, as indicated in step 43. Each "instructed node" then creates a new bit-file relating to the blocks to be backed up on each particular disk by logically ORing the read bits, as indicated in step 44. Each "instructed node" then stores each newly-created bit-file on at least two different disks, as indicated in step 45. Subsequently, or in parallel with the step 45, incremental backup is performed using the new bit-file information. The redo logs can then be cleared. The reason for storing the message and the newly-created bit-files on two different disks is to be able to facilitate recovery if there is a failure after incremental backup has started. If the messages and bit-files are only stored on one disk and there is disk failure, recovery will take longer to achieve.

Figure 5:
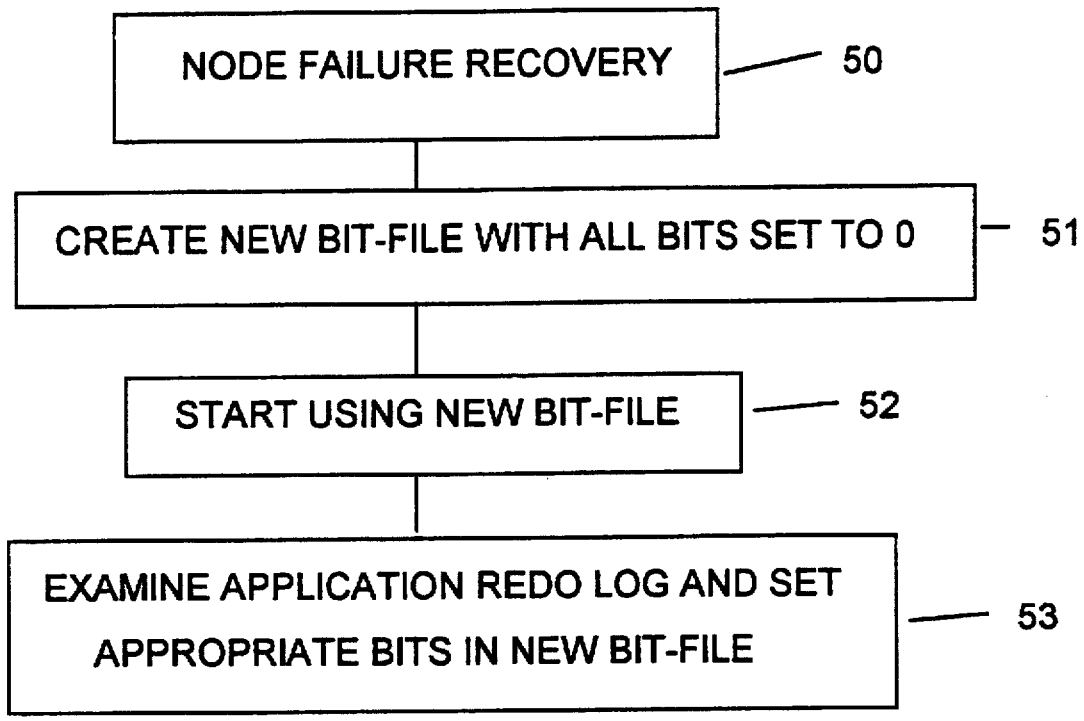
FIG. 5 is a flow chart which indicates the procedure when an incremental backup bit-file is lost.

In FIG. 5 there are illustrated the recovery steps taken when a bit-file is lost by a node before incremental backup is started, such as is the result of loss of power to the node, loss of main memory of the node, by interruption in processing on the node, or by the complete loss of the node. Node failure recovery commences at step 50. A new bit-file is created in the main memory with all its bits set to zero, as in step 51. The new bit-file is immediately available for use by the node, as indicated in step 52, if required. Concurrently, the application's redo log is examined to determine which data blocks have been updated since the last backup, and the appropriate bits in the new bit-file are set to 1, if not already set, as indicated in step 53.

The bit-files are held in the main memories of the nodes, so as to ensure that they can be accessed quickly and hence to ensure that performance is not affected too seriously by the need to unite to these bit files. The main memories are, however, volatile and hence the bit-files will be lost if a node fails. However, this does not matter if a database recovery log is maintained, as described above, since it is possible to reconstruct a bit file from the information in the recovery log.

As will be appreciated, there are separate versions of the bit files, one for each node, each stored in RAM, and there is no communication or synchronisation between the system nodes. Therefore the system performance is only very slightly affected by the incremental backup process.

I claim:

1. A distributed data processing system including a plurality of processing nodes and a plurality of data storage disks which are shared between the nodes and each have a plurality of data blocks, each node storing a respective incremental backup bit-file containing one bit for each block on the shared disks, the respective bit being set when a said node writes data to a said block; means for reading the bit-files of all nodes, forming the logical OR thereof and producing a corresponding new incremental backup bit-file; and means for performing incremental backup in accordance with the new incremental backup bit-file.

2. A system as claimed in claim 1, wherein one said node includes means for constructing an incremental backup message including instructions regarding which node of the plurality of processing nodes is to back up which disks of the plurality of data storage disks and means for sending the incremental backup message to each of the other nodes.

3. A system as claimed in claim 2, wherein the one said node includes means for storing the incremental backup message on at least two different disks of the plurality of storage disks.

4. A system as claimed in claim 2, wherein each node includes means whereby in response to the incremental backup message, that node's respective backup bit-file is stored on at least two different disks of the plurality of data storage disks, and means whereby the bit-file stored at the node is cleared.

5. A system as claimed claim 2, wherein each node required by the instructions to perform an incremental backup includes means for reading the bit-files stored on the respective disks, forming the logical OR thereof, producing a respective new bit-file and performing the incremental backup of the respective disks.

6. A system as claimed in claim 5 and including means whereby the respective new bit-file is stored on two different disks of the plurality of data storage disks before or in parallel with the incremental backup.

7. A system as claimed in claim 6 and including a redo log, wherein each node has a volatile main memory in which the respective incremental backup bit-file is stored, and including means whereby when data is written to a said data block it is also written to the redo log.

8. A system as claimed in claim 7 and including means for clearing the redo log upon completion of said incremental backup.

9. A method for achieving incremental backup in a distributed data processing system including a plurality of processing nodes and a plurality of data storage disks' shared between the nodes and each having a plurality of data blocks, including the steps of storing a respective incremental backup bit-file at each node, the backup bit-files each containing one bit for each block on the shared disks; setting the respective bit when a said node writes data to a said block; and when incremental backup is required, reading the bit files of all nodes, forming the logical OR thereof and producing a corresponding new incremental backup bit-file, and performing incremental backup in accordance with the new incremental backup bit-file.

10. A method as claimed in claim 9 wherein one said node performs the reading, logical OR formation and new bit-file production, and wherein said one node constructs an incremental backup message including instructions regarding which node of the plurality of processing nodes is to backup which disks, and including the step of sending the incremental backup message from the one said node to each of the other nodes of the plurality of processing nodes.

11. A method as claimed in claim 10, including the step of storing the incremental backup message on at least two different disks of the plurality of data storage disks.

12. A method as claimed in claim 10, wherein in response to the incremental backup message each node stores its respective backup bit-file on at least two different disks of the plurality of data storage disks, and the bit-file stored at each node is cleared.

13. A method as claimed in claim 10, wherein each node required by the instructions to perform an incremental backup, reads the bit-files stored on the respective disks, forms the logical OR thereof, produces a respective new bit-file and performs the incremental backup of the respective disks.

14. A method as claimed in claim 13 and wherein the respective new bit-file is stored on two different disks of the plurality of data storage disks before or in parallel with the incremental backup.

15. A method as claimed in claim 9 including the step of writing data to a redo log when it is written to a said datablock.

16. A method as claimed in claim 15 and including the step of clearing the redo log upon completion of said incremental backup.

17. A distributed data processing system including:

a plurality of processing nodes;

a plurality of data storage disks, shared between the nodes, each having a plurality of data blocks;

a network interconnecting the nodes;

each node having a memory in which is stored a respective incremental backup bit-file containing one bit for each data block on the shared disks, which bits are initially set to a first of two possible states, and each node having means for setting the respective bit in its backup bit-file to the other of the two possible states when that node writes data to one of said data block;

at least one of said nodes including means for reading the backup bit-files of all of the nodes and forming the logical OR thereof, and producing a corresponding new incremental backup bit-file;

and the system including means for performing incremental backup in accordance with the new incremental backup bit-file by backing up those blocks whose bit-file bits are set to the other state.

18. A method for achieving incremental backup in a distributed data processing system including a plurality of processing nodes each having a respective memory, a plurality of data storage disks each having a plurality of datablocks, the disks being shared between the nodes, the method including the steps of:

storing in the memory of each node a respective incremental backup bit-file containing one bit for each datablock on the shared disks, which bits are initially set to a first of two possible states, and setting the respective bit in a said backup bit-file to the other of the two possible states when the respective node writes data to one of said datablocks;

and wherein when incremental backup is required, causing one of said nodes to read the backup bit-files of all of the nodes, to form the logical OR thereof and to produce a corresponding new incremental backup bit-file, and performing incremental backup in accordance with the new incremental backup bit-file by backing up those blocks whose bits are set to the other state.

* * * * *